Jan. 26, 1960
A. C. SUBACH ET AL
2,922,333
OPTICAL PROJECTION MOTION ANALYZER
Filed Nov. 15, 1954
2 Sheets-Sheet 1
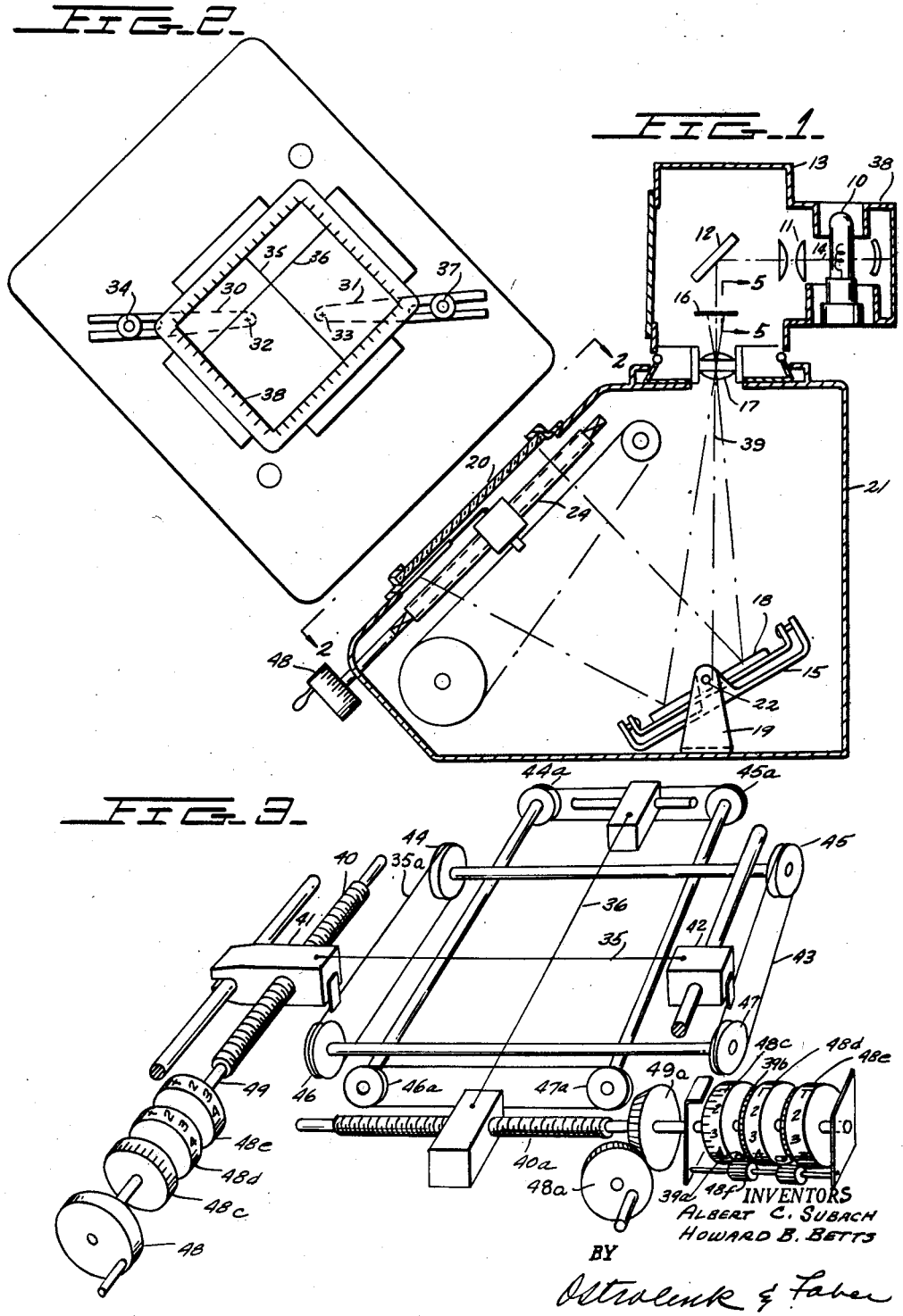
INVENTORS
ALBERT C. SUBACH
HOWARD B. BETTS
BY
Ostrolenk & Faber
ATTORNEYS

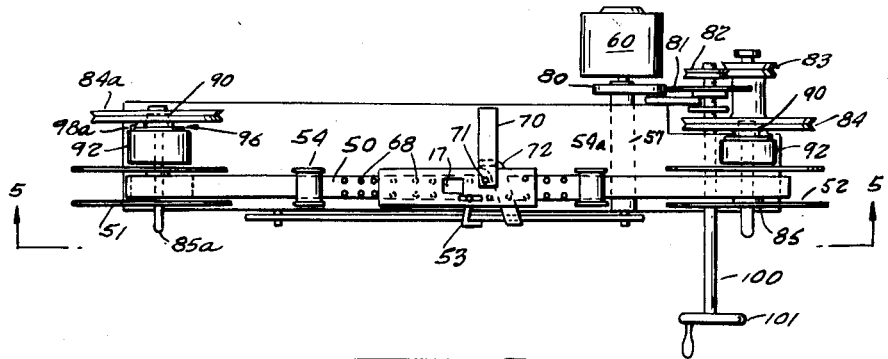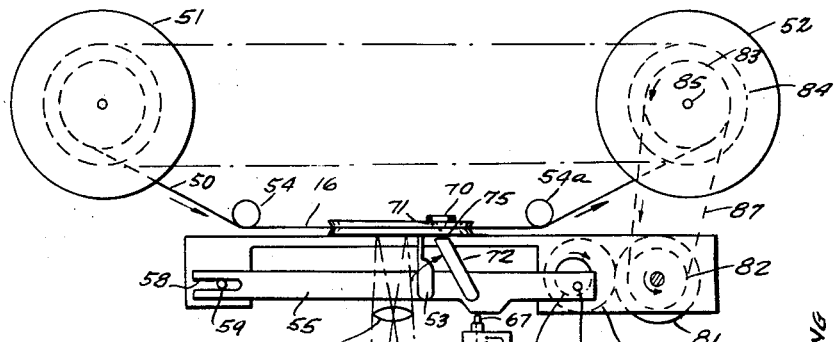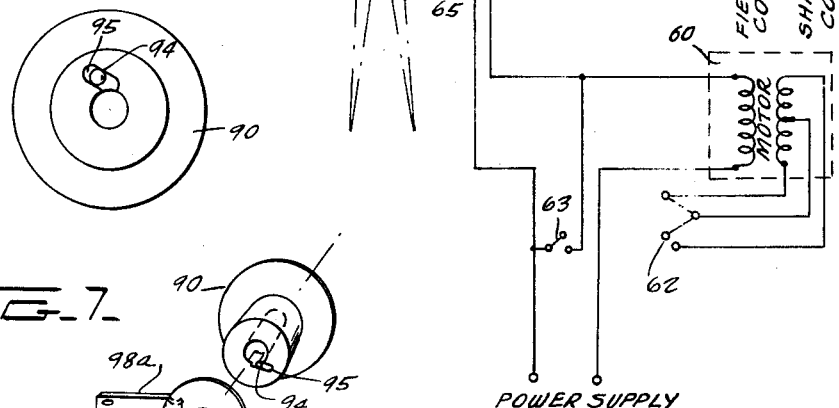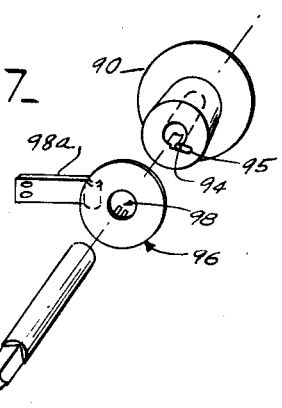

United States Patent Office 2,922,333
Patented Jan. 26, 1960

2,922,333

OPTICAL PROJECTION MOTION ANALYZER

Albert C. Subach, New Hyde Park, and Howard B. Betts, Brooklyn, N.Y., assignors to Vanguard Instrument Corporation, Valley Stream, N.Y., a corporation of New York Application November 15, 1954, Serial No. 468,799

2 Claims. (Cl. 88—24)

Our invention relates to an apparatus for projection of a photographic image and more particularly to a projector used for the measurement and observation of images on motion picture film for the purpose of data reduction, said apparatus hereinafter referred to as a motion analyzer.

In making linear measurements on motion picture film, which are to be correlated with time as indicated by frame count or timing marks on the film, it has always been desirable and not heretofore achieved, to provide a device which would be able to (1) drive film single frame or continuously in either direction with very accurate registration, (2) provide a coordinate crosshair system capable of accurately measuring relative distances on the projected image, (3) provide means for correcting background or image shift which may be due to a variety of causes either inherent in the taking of the motion picture or in the movement of the subject matter, and (4) provide a visual record of frame count.

Accordingly, it is an object of our invention to provide a novel motion analyzer comprising a combination of mechanical and optical elements which coact to give maximum efficiency and convenience in the observation and measurement of images projected from motion picture films.

Another object of our invention is to provide a motion analyzer with a motorized feed capable of driving film either continuously or single-frame and in either direction while maintaining high accurate registration.

Another object of our invention is to provide a coordinate crosshair system capable of accurately measuring relative distances on photographic images.

Still another object is to provide a novel means for the correction of background on overall image shift which may occur from frame to frame in motion picture film due to misalignment of sprocket holes in the film, poor registration in taking the picture, or actual shifts of the subject matter involved.

These and other objects of our invention will be apparent from the following description when taken in connection with the drawings in which:

Figure 1 is a side view of our motion analyzer which illustrates schematically the optical system and the light path from the light source to the point of final projection of the film.

Figure 2 illustrates how our novel analyzer as taken along the lines 2—2 looking in the direction of the arrows, would appear to the operator or the observer. The figure also shows the relative position which may be occupied by crosshair and the transparent markers.

Figure 3 illustrates schematically the mechanism for operating the coordinate crosshair system.

Figure 4 illustrates a top view of the film advance mechanism in our novel motion analyzer.

Figure 5 is a view of the film advance mechanism taken along the lines 5—5 in Figure 4, looking in the direction of the arrows, and illustrates the switching arrangement whereby the operator may select either continuous or single-frame advance of the film.

Figure 6 shows in detail the clutching arrangement whereby the shaft of the film feeding spool operates to meet the requirement of either feeding or taking up film depending on the direction of the film feed.

Figure 7 is an exploded view of the clutching arrangement shown in Figure 6.

Essentially our motion analyzer comprises an optical system for passing the light through the film, and then focusing the film image on a screen which is provided with a movable coordinate crosshair system and transparent markers so that any linear motion between successive frames of films may be quantitatively analyzed. The optical system includes a mirror mounted on gimbal rings and universally adjustable so as to compensate for any background shift which may occur as the film is advanced.

Accurate registration in the movement of film through our motion analyzer is provided by an oscillatable link to which is rigidly secured both a claw for moving the film and an arm for coordinating the movement of the registration pin in and out of successive perforations in the film. Provision is also made for manual and for single-frame operation of our device. In addition, we include a clutching device which allows the film feeding reel or spool to be operated independently of the film driving means.

Referring now to the drawings in more detail, Figure 1 illustrates an optical system which may be used in connection with our motion analyzer. The system comprises a projection lamp or other suitable light source 10, condenser 11 and mirror 12 contained within housing 13, objective lens 17, mirror 18 and screen 20. The screen is made of ground glass or other suitable translucent material.

The projection lamp, condenser and mirror are all contained on housing 13 which also contains the film feeding means hereinafter described, the film being at level 16. The balance of the apparatus is contained within housing 21. This includes reflecting mirror 18 which is secured to frame 15 and mounted on support 19 by gimbal rings 22. The gimbal rings allow for the universal tilting of the mirror so as to compensate for vertical and horizontal shift as film is advanced and observed. Rotational shift, on the other hand, is corrected for by rotating head 38 which turns on its optical axis 39. In this way, the picture under study may be reoriented when any type of background shift of the picture within the frame occurs. This is of particular value since the sequence of measurements is always relative to an assumed stationary background. The cross hair measuring system is located at 24 and is hereinafter referred to in more detail in connection with Figure 3.

The light path is from light source 10 through aperture 14, condenser 11 and then from mirror 12 through the film 16, objective lens 17, mirror 18 with the image finally being projected on translucent screen 20. Graduated markings 38 may be permanently or removably attached to the screen or to the frame thereof in any manner suitable for convenient reading by the operator.

Figure 2 illustrates our provision for observing background shift. This is done by means of transparent markers 30 and 31 which have cross lines 32 and 33 at their tips, and are adjustable about pins 34 and 37 so as to coincide with some point in the picture background; at which position they are clamped in place. Markers 31 and 32 may be adjusted throughout the picture area and are preferably located below the viewing screen, although they may be above the screen if desired.

The crosshairs 35 and 36 are moved across the screen at right angles to each other in a manner hereinafter described.

Figure 3 shows the means by which crosshairs 35 and 36 are operated at right angles to each other. Crosshair operation is controlled by micrometer screw 40 whose rotation moves nut 41. The nut carries one end of crosshair 35 and a steel cable 35a. The other end of the crosshair is carried by slider 42 which is attached to steel cable 43. Cables 35a and 43 move accurately in unison due to the rigid connection between pulleys 44 and 45 and between pulleys 46 and 47. The rigidly connected pulleys are of equal diameter and are preferably of sufficient circumference that less than one revolution allows a complete range of travel of the crosshair. The crosshair position is indicated by micrometer dial 48 which is provided with shaft 49 and thereby drives micrometer screw 40 so as to accurately position the crosshair. The same type of arrangement for positioning crosshair 36 is operable from pulleys 44a to 47a. As it may be desirable and convenient for the operator to have the handwheels for both crosshairs facing in the same direction, handwheel 48a instead of driving screw 40a directly, does so through bevel gear 49a.

Micrometer dial 48c is attached directly to shaft 40a so that no backlash exists between it and the micrometer screw. Both micrometer shafts are fitted with counting wheels 48d and 48e which indicate multiples of micrometer revolutions (such as tenths and inches). These counting wheels are indexed by the intermittent gears 48f. A lug 39a on the face of the dial strikes gear 48f and turns it sufficiently so that gear 39b on the next dial brings up the next number in sequence.

Figures 4 and 5 show the film advance mechanism which is employed in our novel motion analyzer. The film 50 at the focal plane 16 is being transported between reels or spools 51 or 52 under guide rollers 54 and 54a. Motion is imparted by a claw 53 rigidly attached to link 55. The claw 53 follows an approximate elliptical path as dictated by the eccentrically mounted pin 56 on shaft 57 and the slot 58 at pin 59. It is apparent that when shaft 57 is rotated clockwise, film will advance to the right as indicated by the arrows. Thus, clockwise rotation of shaft 57 causes link 55 and hence claw 53 to move to the right in its upward path. At the same time, friction segment 80 drives wheel 81 which, through the shaft and pulley arrangement hereinafter described drive take-up wheel 52. The counterclockwise rotation of take-up wheel 52 cooperates in pulling the film to the right. On the other hand, when shaft 57 rotates counterclockwise, it will advance the film to the left. The shaft is driven by a reversible electric motor 60 geared to produce one revolution at 57 in any desired time interval. Selection of the direction of film feed is made through a selector switch 62 which controls the direction of motor rotation.

Accurate registration is provided by the registration pin mount represented by leaf spring 70, the pin being at 71. This type of mounting completely eliminates any small amount of play or looseness inherent in the conventional system where sliding fits are used in moving the pin in and out of the film notches or sprocket holes 68. The pin 71 is rigidly fastened to the spring 70 and the spring is of sufficient thickness that no perceptible variation in the pin down position occurs as the pin is dropped successively into the film sprocket holes. In operation, the registration pin is cammed out of the film by arm 72 carried on link 55 which serves to operate both claw and pin in correct synchronism.

A single-frame feed cycle is initiated by depressing a momentary switch 63. As motion starts, the normally open switch 65 is closed and maintains power to drive motor 60 until one revolution occurs and link 55 returns and cams the switch open by pressing on button 67, thereby stopping the motor.

Thus, in moving the film in accurate registration, arm or link 55 mounted on crank pin 56 oscillates upon the rotation of the crank pin. This lifts up the finger or claw 53 into a notch of the film and moves the film to the left or right depending on the direction of rotation of shaft 57. When the shaft is moved 180°, the arm 53 moves down again because the link moves down and the film has been transported one frame. The spring 70 with pin 71 moves down into a notch of the film to register it exactly. Consequently, the link 55 carries arm 72 which strikes the spring 70 at 75 and lifts the spring along with registration pin 71 up out of the film notch just before the arm 53 engages the film notch to move it.

In order to provide film take up, a friction segment 80 drives wheel 81 with its attached pulley 82. When motor 60 drives wheel 81, pulley 82 rotates freely on shaft 100. A spring type or other suitable belt 87 drives the pulley 83 with its attached pulley 84. Pulley 84 drives pulley 84a. These pulleys are connected to the spool shafts 85 and 85a in such a manner that the shaft may be made either driven or be made completely free from the driving pulleys 84 and 84a to automatically suit the requirement of feeding in either direction. This is done by a clutch arrangement which will now be described. The said clutch arrangement is applied to the shaft of reels or spools 51 and 52.

Referring now to Figures 4, 6 and 7, the ball clutch 90 therein illustrated instead of being conventionally controlled by relative motion between the shaft and ball, is controlled by relative motion between the assembly 84a—90 and the frame 92. The hardened steel ball 94 fits in pocket 95. When washer 96 turns relative to the pulley, the ball is cammed back and forth, by the lugs 98, engaging and disengaging the shaft. The lugs 98 fit into pocket 95 on each side of the ball. The washer 96 is actuated by contact with the frame 92 through pressure spring 98a. This arrangement allows the feed spool to be unwound at any speed required by the film radius at any given moment. This, of course, may be faster or slower than the rotational speed at pulleys 83 or 84. The camming surfaces 95 are so arranged that rotation at pulleys 82, 83, 84 and 84a drive the proper spool as the take-up reel. The automatic selection of which pulley is to be the driven take-up reel and which is the free-wheeling feed spool is dictated of course, on the direction of feed.

Provision for manual winding and searching is provided by a crank 101 at shaft 100. This shaft is longitudinally slidable and carries appropriate detents so that the wheel 81 may be disengaged from the segment 80, pulley 82 becomes locked to shaft 100 and simultaneously registration pin 71 is cammed out through a suitable lever. In this position the mechanism is ready for manual film feed in either direction, by drive thru pulleys 82, 83, 84 and 84a.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. In an apparatus for the measurement and observation of images projected from motion picture film which comprises an optical system for the projection of an image; said optical system including a projection lamp, an adjustable mirror mounted on gimbal rings, and a translucent screen for the reception of the image; said screen having associated therewith coordinate crosshairs selectively mounted at right angles to one another across the area of said screen; a film driving means, a film feeding device, and a first means for accurately registering the movement of film across the path of light rays emanating from the projection lamp; said first means comprising a registration pin, an oscillatable link, a claw rigidly secured to said link for moving the film along a film path, an arm also rigidly secured to said link for coordinating movement of said registration pin in and out of successive notches in a film with movement of this film; and clutch means operable to a first position wherein said film feeding device is connected to said film driving means for operation thereby; said clutch means being selectively operable to a second position wherein said film feeding device is manually operable independently of the film driving means; means operatively connectable to said film driving means for moving film through the apparatus and automatically stopping said film after the advance of a single frame thereof; and means for reversing the direction of drive of the said film.

2. The apparatus as set forth in claim 1 in which the first means also includes a leaf spring operatively positioned for engagement by said arm, said registration pin being biased toward the film path by said leaf spring.

References Cited in the file of this patent

UNITED STATES PATENTS

| | | |
|---|---|---|
| 1,631,570 | Amet | June 7, 1927 |
| 1,850,955 | Fear | Mar. 22, 1932 |
| 1,851,400 | Mitchell | Mar. 29, 1932 |
| 2,006,408 | Reichart | July 2, 1935 |
| 2,037,124 | Fear | Apr. 14, 1936 |
| 2,046,844 | Proctor | July 7, 1936 |
| 2,087,250 | Foster | July 20, 1937 |
| 2,284,558 | Briechle | May 26, 1942 |
| 2,296,928 | Briechle et al. | Sept. 29, 1942 |
| 2,360,361 | Montbatten | Oct. 17, 1944 |
| 2,528,840 | Mitchell | Nov. 7, 1950 |
| 2,661,656 | Bangsbergh | Dec. 8, 1953 |
| 2,665,608 | Clark | Jan. 12, 1954 |

FOREIGN PATENTS

| | | |
|---|---|---|
| 345,049 | Great Britain | Mar. 19, 1931 |